UNITED STATES PATENT OFFICE.

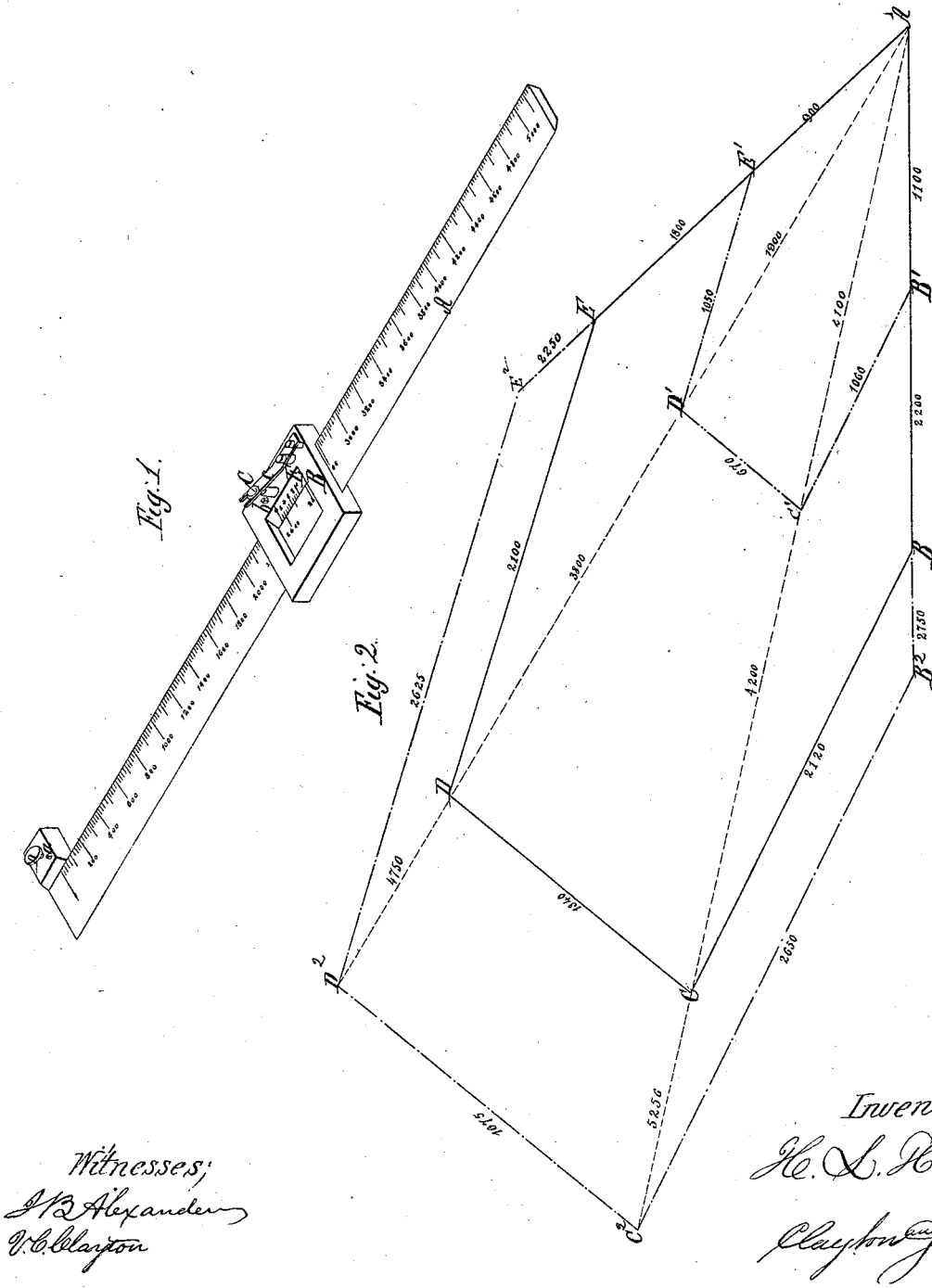

HORACE L. HERVEY, OF WINDSOR, CONNECTICUT.

IMPROVEMENT IN PLOTTING-INSTRUMENTS.

Specification forming part of Letters Patent No. 41,005, dated December 22, 1863.

*To all whom it may concern:*

Be it known that I, HORACE L. HERVEY, of Windsor, Hartford county, in the State of Connecticut, have invented a new and useful Instrument for Plotting, &c., for Surveyors' Use; and I do hereby declare that the following is a full and exact description thereof, reference being had to the accompanying drawings, and to the characters of reference thereon.

Figure 1 is a perspective view. Fig. 2 is a diagram, showing the manner of laying down a "plot," and also of enlarging or diminishing it.

To enable those skilled in the art to make and use my invention, I will describe its construction and operation.

A is a thin, flat ruler, with a scale, in feet or rods, upon its upper surface.

B is a slide upon the scale-ruler, which plays in a V-groove in the under side of the slide. I may find it convenient to provide the slide B with a pinion, operated by a thumb-screw, and the scale with a rack to be meshed into by the pinion. The slide is provided with a vernier, E.

C is the pricking-point, which passes through the slide, and is held up by a spring, $c$.

D is the holding-point, near one end of the scale-ruler, and opposite the zero-point. A line drawn through the points C and D must be parallel to the scale.

When the instrument is used for plotting upon a very large scale, it may be desirable to affix telescopes at each end of the scale in order to align with great correctness.

$a$ and $b$ are points for application of the legs of dividers.

My instrument is intended to be used either for plotting upon a drawing-board and tripod, when used in connection with my instrument for measuring distances, &c., patented June 3, 1856, or for laying down or enlarging or diminishing plots in the surveyor's office.

In the operation of my invention, suppose that I wish to plot a piece of land, A B C D E A, (black lines in drawings,) I take the instrument and stick the holding-point D at any point A. I know from my measuring-machine the distances to the corners B, C, D, and E of the lot. I then sight the instrument for the corner B, and move the slide until the scale and vernier indicate the distance—*e. g.*, 2,200 feet. The thumb is then pressed upon the pricking-point C, thus making an indented point upon the paper. I then in like manner indicate the corners C, D, and E, and then properly connect them, as shown in black lines in Fig. 2. If I now wish to ascertain the length of the several sides of the plot, I take the measure of a side with a pair of micrometer compasses, and insert one point thereof in the standard-point $a$, opposite zero of the scale, and then shove the slide until the other point will touch the standard-point $b$, opposite the zero of the vernier. The distance thus indicated by the vernier and scale will be the length of the side. In the said plot the distance to the corner B is 2,200; to corner C, 4,200; to corner D, 3,800; to corner E, 1,800—giving the following lengths for its sides: AB=2,200, BC=2,120, CD=1,340, D E=2,100, and E A=1,800. Having thus shown the plot, if I wish to enlarge it, I lay the sheet of paper upon which it is drawn over the sheet for the larger plot. With the holding-point D at the same point, A, (when I wish to enlarge one-fourth,) I move the slide until the corner $B^2$ is reached, =2,750, when I press the pricker, and thus secure that corner. In like manner I prick the corner $C^2$=5,250, the corner $D^2$=4,750, and the corner $E^2$=2,250. Then in the manner above described I find the sides, $AB^2$=2,750, $B^2C^2$=2,650, $C^2D^2$=1,675, $D^2E^2$=2,625, and $E^2A^2$=2,250—all of which is clearly shown in blue lines, letters, and figures in Fig. 2.

The manner of reducing a drawing one-half is similar, and is clearly shown by the red lines, letters, and figures in Fig. 2.

What I claim as new, and desire to secure by Letters Patent, is—

The straight-edge scale A, in combination with the sliding vernier B, when constructed and operating substantially as herein set forth, and for plotting and enlarging or reducing plots.

In testimony that I claim the above I hereunto set my hand.

HORACE L. HERVEY.

In presence of—
J. D. WILLOUGHBY,
JO. C. CLAYTON.